United States Patent [19]

Nakajima et al.

[11] 4,023,011

[45] May 10, 1977

[54] AUTOMATIC BANK NOTE DEPOSITING MACHINE

[75] Inventors: Shunichi Nakajima; Nobuo Kobayashi; Yoshio Ariga, all of Yokohama, Japan

[73] Assignee: Tokyo Shibaura Electric Co., Ltd., Kawasaki, Japan

[22] Filed: June 30, 1975

[21] Appl. No.: 591,315

[52] U.S. Cl. .......................... 235/61.11 R; 194/4 R

[51] Int. Cl.² ........................................ G06K 17/00

[58] Field of Search .................... 340/149 A, 149 R; 194/4 R, DIG. 9; 235/61.11 R, 61.11 K, 61.7 B

[56] References Cited

UNITED STATES PATENTS

| | | | |
|---|---|---|---|
| 3,104,314 | 9/1963 | Simjian | 235/61.11 |
| 3,487,905 | 1/1970 | James, Sr. | 235/61.11 |
| 3,778,596 | 12/1973 | Wapner | 235/61.11 |

*Primary Examiner*—Vincent P. Canney
*Attorney, Agent, or Firm*—Finnegan, Henderson, Farabow & Garrett

[57] ABSTRACT

An automatic paper currency depositing machine comprises a supply section into which a unit of paper currencies is deposited, a device for taking out the paper currencies piece by piece from the supply section and transferring it, a sensing section for judging at least one of the genuineness, validity and kind of the paper currencies as well as takeout of any overlapped paper currencies, a sorting gate for sorting out the deposited paper currencies into fit bank notes, unfit bank notes and overlapped paper currencies as a result of such a judgement at the sensing section, a reject pocket into which the unfit paper currencies and overlapped bank notes are sent, a storage section for receiving the fit paper currencies for stacking, and a device for calculating a total amount of fit paper currencies.

6 Claims, 7 Drawing Figures

AUTOMATIC BANK NOTE DEPOSITING MACHINE

This invention relates to an automatic paper currency depositing machine capable of depositing a plurality of paper currencies in a unit.

A conventional paper currency depositing machine is of the type in which paper currencies are deposited piece by piece through an inlet. This type of machine, however, requires a tedious piece-by-piece depositing operation and thus rather a lengthy time when many paper currencies are involved. Problem is also presented in preventing a possible crime.

It is accordingly the object of this invention to provide an automatic paper currency depositing machine capable of depositing a plurality of paper currencies in a unit and thus assuring a rapid, accurate depositing operation.

According to this invention there is provided an automatic paper currency depositing machine comprising a supply section into which a unit of paper currencies is deposited; a device for taking out the paper currencies piece by piece from the supply section and transferring it; a sensing section for judging at least one of the genuineness, validity and kind of the paper currencies as well as takeout of any overlapped paper currencies; a sorting gate for sorting out fit paper currencies, unfit bank notes and overlapped paper currencies as a result of such a judgement at the sensing section; a reject pocket into which the unfit paper currencies and overlapped bank notes are sent; a storage section for receiving the fit bank notes for stacking; and a device for calculating a total amount of fit bank notes.

This invention can be more fully understood from the following detailed description when taken in conjunction with the accompanying drawings, in which:

FIG. 1, consisting of 1A and 1B, is a view showing an arrangement of an automatic paper currency depositing machine according to one embodiment of this invention;

One embodiment of this invention will now be explained by reference to the accompanying drawings.

Figure 1:
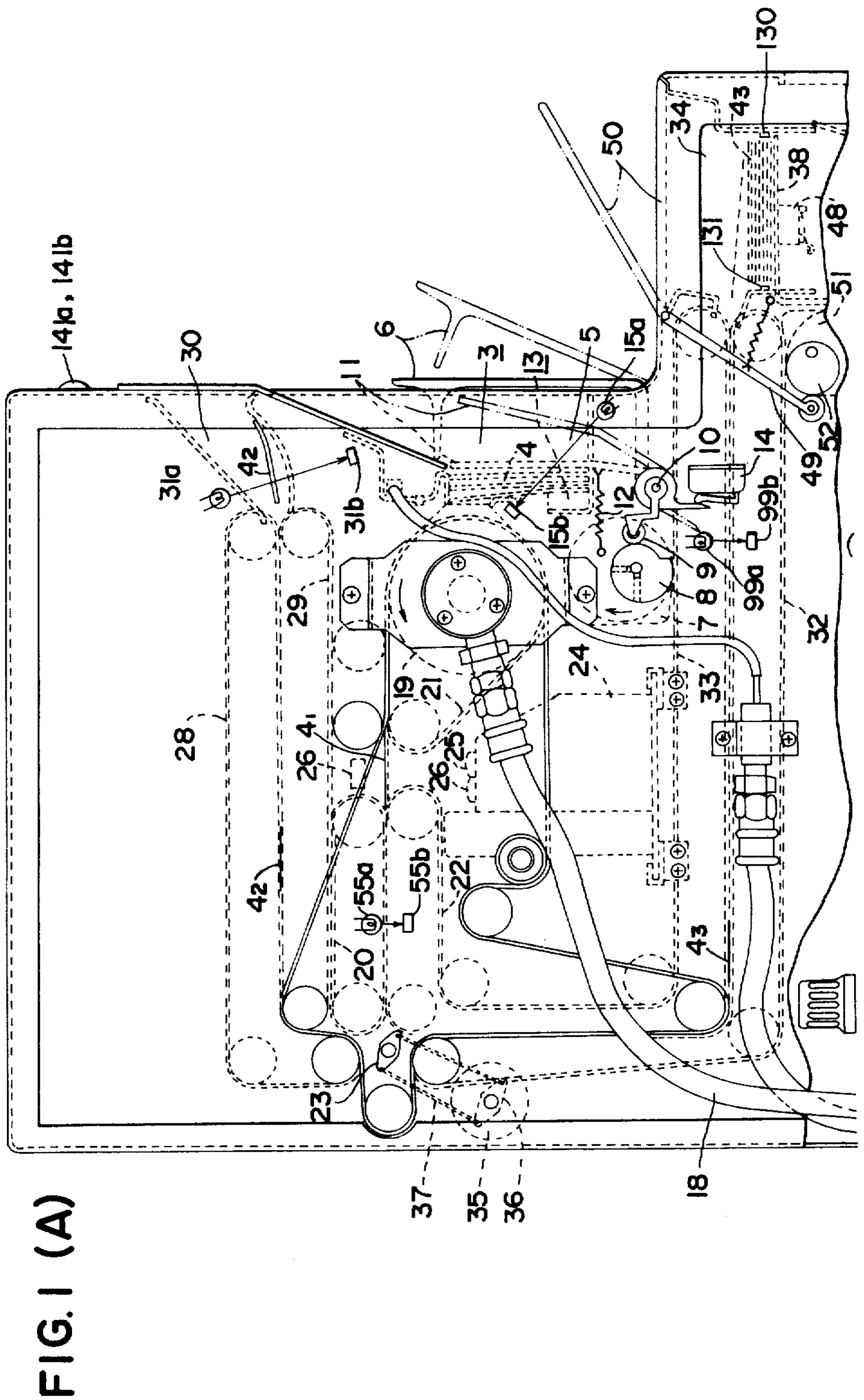
Figure 1B:
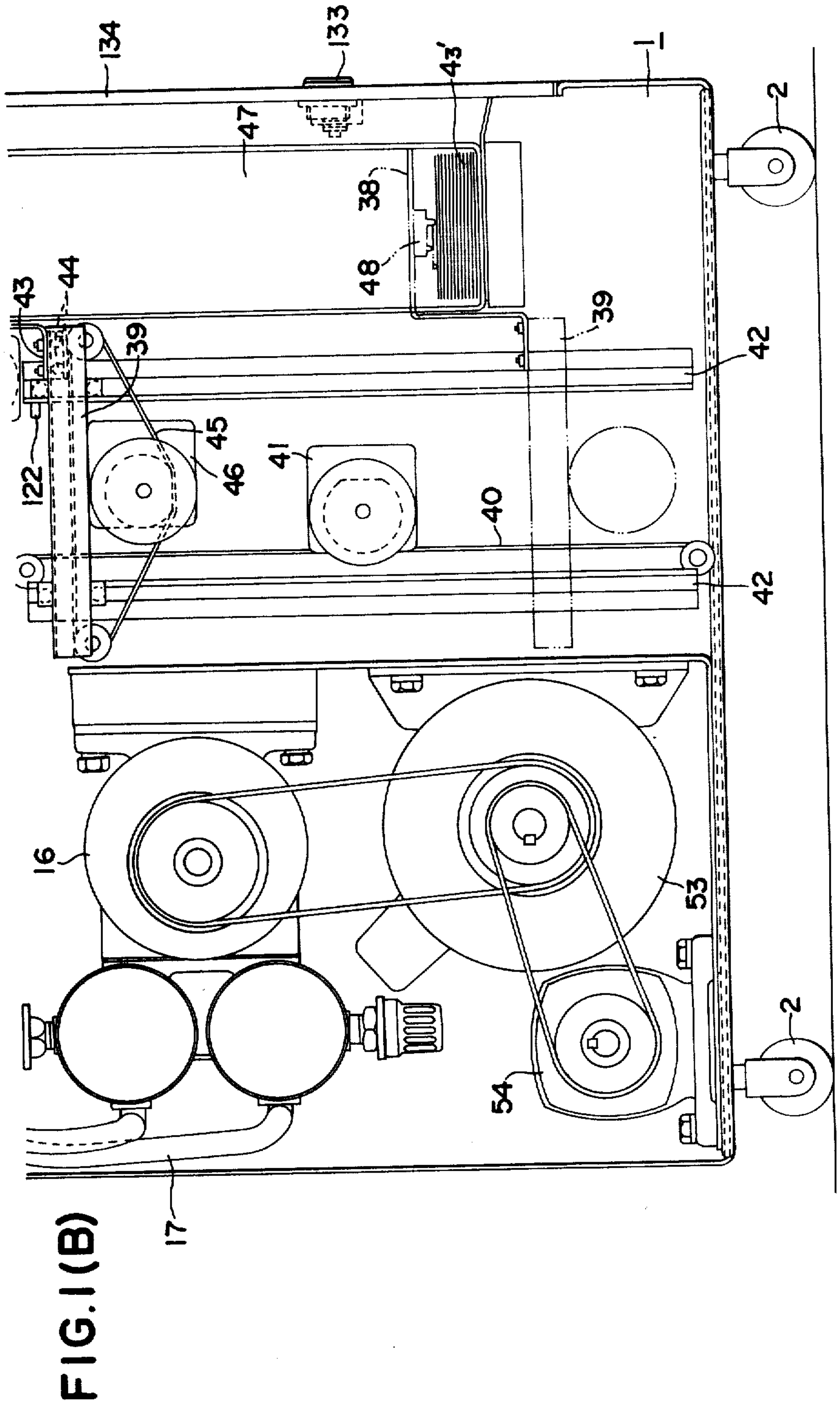

In FIG. 1, reference numeral 1 is a paper currency depositing machine housing movable by casters 2, and 3 is a paper currency supply section provided within the front side of the housing 1. The paper currency supply section 3 has a receiving chamber 5 for holding a unit of paper currencies 4 and a covering plate 6 for closing the receiving chamber 5. The unit of paper currencies 4 is vertically held in the receiving chamber 5 as shown in FIG. 1 (A). When a cam 8 is rotated clockwise by a motor 7 to cause a roller 9 to be pushed toward the front side of the housing 1, the covering plate 6 is swung open with a support axis as a fulcrum.

When the cam 8 is returned to an original position, the covering plate 6 is closed. The paper currencies 4 can be set in a unit by opening the covering plate 6 and pulling a backup 11 toward the user. The backup 11, when released, is returned under the influence of a spring 12 to clamp the paper currencies 4 between the backup 11 and a front check 13. The setting of the paper currencies and closing of the covering plate 6 are detected by a switch 14. Whether the paper currencies 4 are set or not is detected by a lamp **15*a* and a photoelectric sensor 15*b*. An air is blown from a vacuum pump 16 through a tubing 17 toward the paper currencies 4 set within the paper currency supply section 3. The paper currencies are taken out piece by piece, through a tubing 18, from the paper currency supply section 3 by a vacuum takeout roller 19. The paper currency $4_1$ is transmitted toward a sorting gate 23 in a manner to be sandwiched between endless belts 20 and 21, and 20 and 22, which are trained around pulleys. By a sensing section 24 including a light source 25, light receiving element 26 and preamplifier 27, the paper currency $4_1$ is judged, on its way to the sorting gate 23, as to its genuineness, validity and kind as well as the presence of a mistake such as the takeout of any overlapped paper currencies. Any unfit currencies or overlapped paper currencies as sensed at the sensing section 24 are sorted out by the sorting gate 23, transmitted in a manner to be sandwiched between endless belts 28 and 29 which are trained around pulleys, and rejected at a reject pocket 30. The rejected paper currency $4_2$ is detected by photoelectric sensors 31*a*, 31*b*. It is convenient if a sorting gate is provided at the reject pocket 30 to individually sort out the unfit currencies and overlapped paper currencies. A fit paper currency $4_3$ sorted out by the sorting gate 23 is carried in a manner to be sandwiched between endless belts 32 and 33 trained around pulleys, and fed to a storage section 34. The sorting action of the sorting gate 23 is effected by swinging an arm 36 by means of a rotary solenoid 35 to cause the arm type sorting gate 23 to be swung through a linkage 37. The fit paper currency $4_3$ fed through the endless belts 32, 33 is stacked on a stack plate 38 within the storage section 34. A stack plate guide section 39 can be moved up and down along a vertical rail 42 by rotating, by means of a motor 41, a belt which is trained around pulleys. A stack plate mounting section 43 set on the stack plate guide section 39 can be laterally moved, through its roller 44, on the stack plate guide section 39. Consequently, the stack plate 38 can be descended within a detachable cashbox 47 and, after moved out of the cashbox 47, be ascended along the side wall of the cashbox 47. A detector piece 48 on the lower surface of the stack plate 38 is adapted to detect the fact that the stack plate 38 is descended into contact with a stack of paper currencies $4_3'$ already deposited. Above the storage section 34 is disposed a covering plate 50 which can be swung open by means of a lever 49. The swinging movement of the lever 49 is effected by rotating a cam 52 by means of a motor 51. A main motor 53 serves to drive the vacuum pump 16 and to effect the takeout and feeding of the paper currencies through a clutch 54. A lamp 55*a* and light receiving element 55*b*** are adapted to detect the jamming of the sequentially fed paper currencies.

Figure 2:
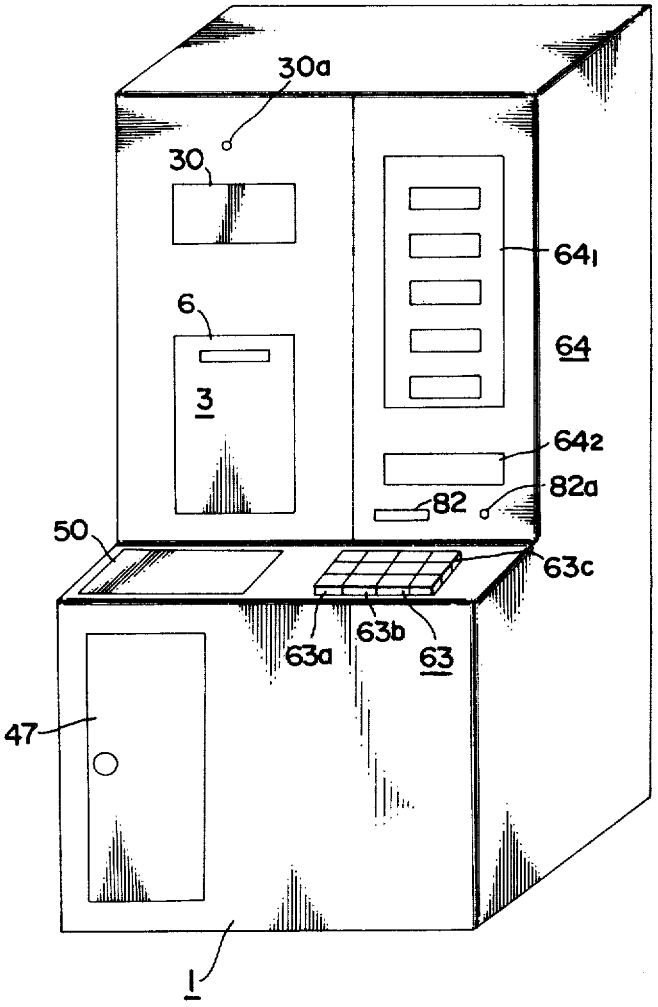
FIG. 2 is a perspective external view showing the machine of FIG. 1.

The automatic paper currency depositing machine of FIG. 1 has, as shown in FIG. 2, a keyboard 63 and display section 64 at its front side. The keyboard 63 includes an approval key **63*a*, disapproval key 63*b***, operator call key etc., as will be explained later, which are operated by a depositor. A portion $64_1$ of the display section 64 displays the number of fit paper currencies of each kind as deposited within the depositing machine, and a portion $64_2$ of the display section 64 displays a total amount of fit paper currencies so deposited. 82 is a slit through which a magnetic card for identification of an individual depositor is inserted. When the magnetic card is inserted into the slit 82, a display lamp 82*a* disposed sideway of the slit 82 is lighted. 30*a* is a lamp for notifying the depositor that the rejected paper currency is present within the reject pocket 30.

Figure 3:
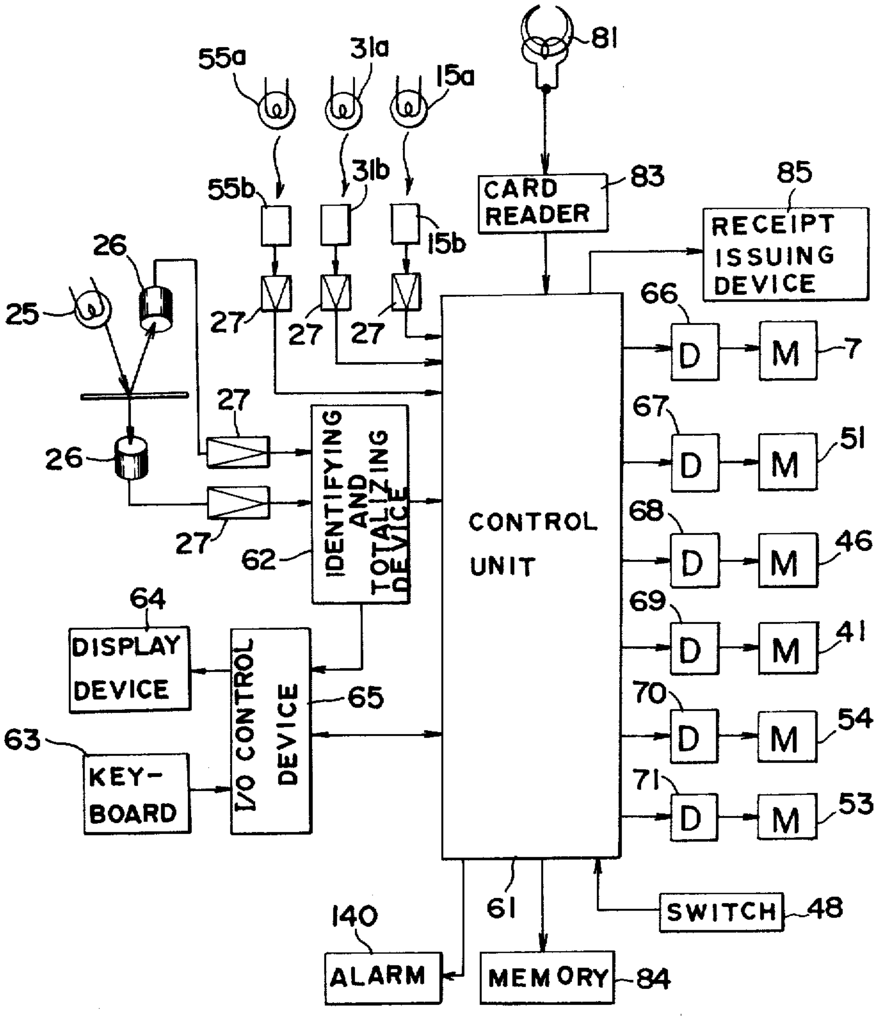
FIG. 3 is a block diagram showing a general arrangement of the machine in FIG. 1.

FIG. 3 is a block diagram showing the automatic paper currency depositing machine of FIG. 1. In this Figure, the same reference numerals are employed to designate parts or elements corresponding to those shown in FIGS. 1 and 2 and any further explanation is, therefore, omitted.

A control unit 61 is adapted to effect the various driving controls of the paper currency depositing machine shown in FIG. 1. A magnetic head 81 is adapted to magnetically detect the code of the individual depositor identification card and an identification circuit 83 identifies the authentication number of the identification card. A paper currency identifying-totalizing device 62 detects the presence of the paper currency, identifies the kind of paper currencies and automatically totalizes the amounts of fit paper currencies so deposited into the paper currency depositing machine. The keyboard 63 has the approval key 63*a* and disapproval key 63*b* through which the depositor can express his intention of approval or disapproval. An input and output control section 65 controls the keyboard 63 and display section 64. The disapproval key 63*b* on the keyboard 63, if depressed, enables now deposited paper currencies to be returned to the depositor; provided, for example, the lamp 30*a* remains lighted, indicating that any rejected paper currency is not present within the reject pocket 30. 84 is a memory for storing the amount of deposited paper currencies and a receipt issuing section 85 issues a receipt for the amount of deposited paper currencies to the depositor. Drivers 66 to 71, each, drive a corresponding motor.

The operation of the automatic paper currency depositing machine of FIG. 1 will now be explained below.

The depositor inserts the individual identification card into the slit 82 and deposits the paper currencies 4 into the paper currency supply section 3. When the covering plate 6 of the paper currency supply section 3 is closed and at the same time the identification card is authentically identified, the paper currencies 4 within the paper currency supply section 3 are taken out piece by piece from the paper currency supply section 3 by the vacuum takeout roll 19 and judged at the sensing section 24. The fit paper currency $4_3$ is fed through the sorting gate 23 to the stack plate 38 of the storage section 34 where they are stacked. The total amount of paper currencies so stacked is totalized at the paper currency identifying-totalizing device62 and displayed at the display section 64. The depositor can depress the approval key 63*a* on the keyboard 63 dependent upon the display made on the display section 64. By depressing the approval key 63*a*, information representative of the authentication number on the identification card and the total amount of deposited paper currencies as totalized at the paper currency identifying-totalizing device 62 are sent to the memory in a central processing device. The motor 41 is then rotated to cause the stack plate 38 to be lowered. When the stack plate 38 is descended to permit the detector piece 48 on the stack plate 38 to be brought into contact with the already deposited fit paper currencies $4_3'$, the motor 46 is rotated to move the stack plate 38 to the left (FIG. 1). The paper currencies on the stack plate 38, when the stack plate 38 is moved out of the cashbox 47, is stacked on the top of the already deposited fit bank notes $4_3'$. Then, the motor 41 is reverse-rotated to ascend the stack plate 38 to the original height and the stack plate 38 is moved leftward, by the rotation of the motor 46, back to a predetermined position in readiness for the next stacking cycle. When the paper currencies are so deposited into the depositing machine, a receipt is issued and the information representative of the amount of deposited paper currencies is stored in the memory 84. If any unfit paper currencies or overlapped paper currencies are detected, they are sent, through the sorting gate 23, back to the reject pocket 30 where the depositor can pick up the rejected paper currency. The lamp 30*a*, if any rejected paper currency is present within the reject pocket 30, remains lighted, indicating the depositor that it should be removed away from the rejected pocket 30. When the amount of deposited paper currencies is incorrectly displayed on the display section 64, the depositor can depress the disapproval key 63*b* on the keyboard 63. By the depression of the disapproval key 63*b*, the motor 41 is rotated to cause the covering plate 50 to be swung open. Then, the motor 41 is rotated to cause the stack plate 38 to be ascended, thus permitting the now deposited back notes to be returned to the depositor. In this way, the depositor can withdraw all the amount of bank notes including the rejected paper currency, if any.

Figure 4:
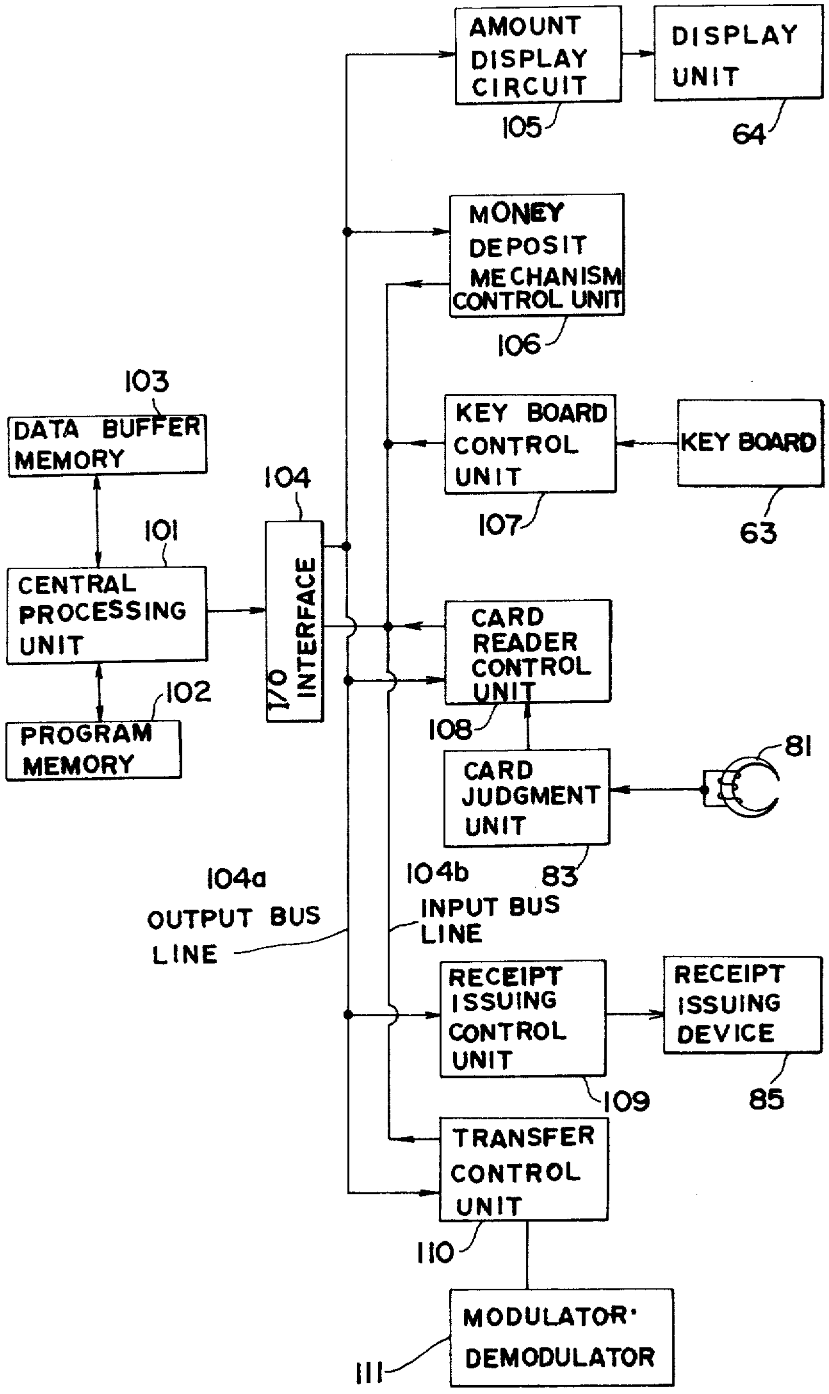
FIG. 4 is a block diagram showing an inner arrangement of a control unit in FIG. 3.
Figure 5:
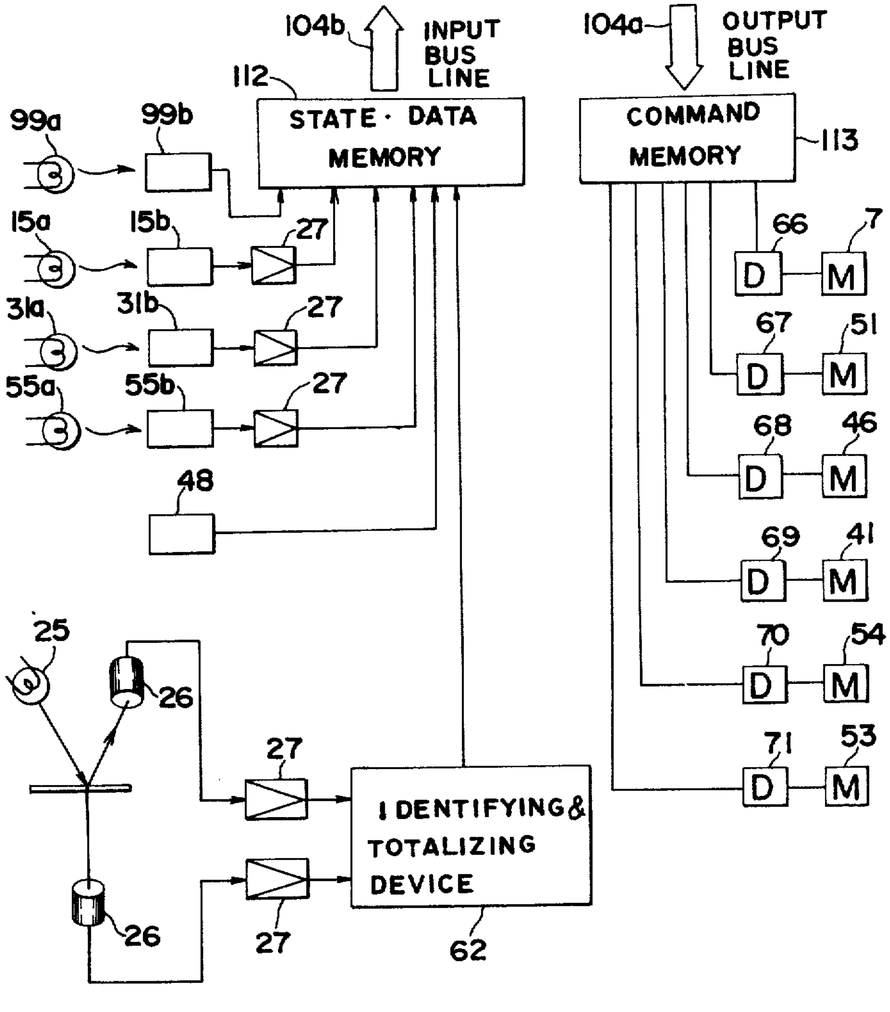
FIG. 5 is a detailed block diagram showing a depositing mechanism control section in FIG. 4.

The construction and operation of the circuit, particularly the control unit 61, will be explained more in detail using block diagrams of FIGS. 4 and 5.

The control unit 61 of FIG. 3 is constructed using an electronic computer. To a central processing unit (CPU) is connected a program memory 102 where a program for the CPU 101 is stored. Also connected to the CPU 101 is a data buffer memory 103 where a data between the CPU 101 and an external device is temporarily stored. The CPU 101 is coupled through an input/output (I/O) interface 104 to an output bus line 104*a* and input bus line 104*b*. The output data of the I/O interface 104 is coupled through the output bus line 104*a* to an amount display circuit 105, a deposit mechanism control unit 106, card reader control unit 108, receipt issuing control unit 109 and transfer control unit 110. The output data of the deposit mechanism control unit 106, keyboard control unit 107, card reader control unit 108 and transfer control unit 110 are fed through the input bus line 104*b* and through the I/O interface to the CPU 101.

The output of the amount display circuit 105 is delivered to the portions $64_1$ and $64_2$ of the display section 64 where the number of deposited fit paper currencies of each kind and the total amount of deposited fit paper currencies are displayed respectively. The keyboard control unit 107 is adapted to receive a signal such as, for example, approval signal, disapproval signal etc. when a key operation is effected on the keyboard, and deliver it through the input bus line 104*b*. The card reader control unit 108 is adapted to control a card reader in accordance with an identification signal of the card identification circuit 83 for receiving and identifying a card data read out at the magnetic head 81. The output of the receipt issuing control unit 109 is delivered to a receipt issuing device where a receipt is issued to the depositor when a depositing operation has been completed.

The construction of the deposit mechanism control unit 106 in FIG. 4 will be explained more in detail by referring to the block diagram of FIG. 5.

The deposit mechanism control section 106 comprises a portion connected to an output bus line 104*a* and a portion connected to an input bus line 104*b*. The input bus line 104*b* is connected to a state-data memory 112. The state-data memory 112 stores information representative of the state of the money delivery device and stack plate and information representative of the number of judged paper currencies and delivers these information to the CPU 101. A command memory 113 connected to the output bus line 104*a* is a circuit for storing an on-off signal to be delivered from the CPU 101 to the motor, clutches etc. of the deposit mechanism. The output of the photoelectric element 15*b* for detecting the set state of the paper currency deposited into the bank note supply section 3, photoelectric element 31*b* for detecting the presence of the paper currency within the reject pocket 30, photoelectric element 55*b* for counting the number of paper currencies deposited within the paper currency supply section 3, and photoelectric element 99*b* for detecting the interception, by the fit paper currency, of a light from a lamp 99*a* for detecting the presence of fit paper currencies stacked within the storage section 34 is fed through a corresponding amplifier 27 to the state-data memory 112. The detection output of the detector piece 48 on the lower surface of the stack plate 38 is also fed to the state-data memory 112. The output of the identifying-totalizing device 62 is fed to the state-data memory 112 where it is stored. Any one of the motor drivers 66 to 71 is driven in accordance with a command information stored in the command memory 113 and any one of the motors 7, 51, 41, 46, 53 and 54 is energized by the output of the drivers 66 to 71.

The operation of a return control circuit for effecting a return control of the stack plate 38 will be explained below.

Figure 6:
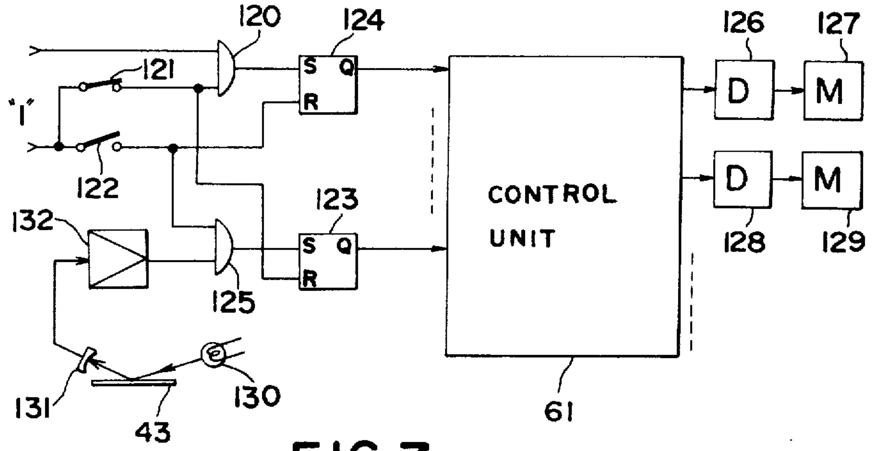
FIG. 6 is an arrangement of a return control circuit in the automatic bank note depositing machine in FIG. 1.

The return control circuit receives as input data, for example, binary logic signals obtained by the ON-OFF control of presence detection switches 121 and 122, a return command signal obtained by depressing a return key on the keyboard 63, and an identification signal obtained from an optical type paper currency identifying section constituted by a light source 130, light receiving element 131 and amplifier 132 etc. The output return command signal (logic signal 1) of the input-output control section 65 is supplied to one input terminal of an AND gate 120. To the other input terminal of the AND gate 120 is supplied a signal (logic 1, 0) obtained from the presence detection switch 121 adapted to be turned ON when the stack plate is located in the predetermined position. The signal from the presence detection switch 121 is also supplied to a reset input terminal R of a flip-flop circuit 123 for returning the stack plate 38 to the predetermined position. To the reset input terminal R of a flip-flop circuit 124 for effecting the return movement of the stack plate 38 is supplied a signal obtained from the presence detection switch 122 adapted to be turned ON when the stack plate 38 is further lifted up to the uppermost position. The signal from the presence detection switch 122 is supplied to one input terminal of an AND gate 125. The output of the AND gate 120 is coupled to the set terminal S of the flip-flop 124 and the output of the AND gate 125 is coupled to the set terminal S of the flip-flop 123. A photoelectrically converted signal from the light receiving element 26 in the optical type paper currency identifying section is wave-shaped at the amplifier 132 where a logic 1 signal is generated when a predetermined amount of light is incident on the light receiving element 131. The logic 1 signal of the amplifier 132 is coupled to the other input terminal of the AND gate 125. The Q output of the flip-flops 123 and 124 is fed to the control unit 61. When the flip-flop 124 is set, a return driving signal is supplied through a driver circuit 126 to the motor 127. When, on the other hand, the flip-flop 123 is set, a signal for returning the stack plate 38 to the predetermined position is supplied to the motor 127. To explain more in detail, when a return command signal, together with the logic 1 signal of the position detection switch 121, is supplied to the AND gate 120, an output appears from the AND gate 120. The output of the AND gate 120 is coupled to the set terminal of the flip-flop 124 to cause the latter to be set. By the command signal of the control unit 61 the motor 127 is driven to cause the stack plate 38 to be lifted from the predetermined position up to the uppermost position. At the same time, the motor 129 is rotated to control the opening of the covering plate 50. When the horizontal guide rail 39 on the stack plate 38 is ascended up to the uppermost portion of the vertical guide rail 42, the presence detection switch 122 is abutted against the horizontal guide rail 39 to be rendered ON (At this time, the switch 121 has already been turned OFF.), causing the flip-flop 124 to be reset. As a result, the stack plate 38 is stopped up to the uppermost position for the depositor to gain easy access to the now deposited paper currencies on the stack plate 38, since the covering plate 50 is swung open at this time. At the same time, a logic 1 signal is supplied to one input terminal of the AND gate 125. When the paper currencies on the stack plate 38 are all removed from the stack plate 38, an illuminating light from the light source 130 is reflected on a reflector on the stack plate 38 and received on the light receiving element 131 to cause the amplifier circuit 132 to generate a logic 1 signal. As a result, the AND gate 125 is opened to make the flip-flop 123 to be in the set condition, causing the motor 129 to be operated to permit the covering plate 50 to be closed. On the other hand, a signal for returning the stack plate 38 to the predetermined position is delivered to the motor 127, causing the motor 127 to be reverse-rotated to permit the stack plate 38 to be lowered. When the stack plate 38 reaches the predetermined position, the presence detection switch 121 is abutted against the horizontal guide rail 39 to cause the former to be again closed. The closure of the detection switch 121 resets the flip-flop 123 to cause the stack plate 38 to be stopped to the predetermined position.

Where it is desired to return all the deposited paper currencies to the depositor due to a discrepancy between the displayed amount of paper currencies deposited and an actual amount of paper currencies deposited, the disapproval or return key 63*b* is depressed on the keyboard 63. By so doing, a return driving signal is delivered from the control unit 61 to the motors 127 and 129. When the motor 129 is rotated upon receipt of the return driving signal, the covering plate 50 is swung open, while at the same time the stack plate 38 is lifted from the predetermined position to the uppermost position for the depositor to get easy access to the now deposited paper currencies. When the paper currencies on the stack plate 38 are all removed by the depositor, the stack plate 38 is descended to the predetermined position and stopped there in readiness for the next depositing operation. That is, when as shown in FIG. 6 a return command signal is fed through the AND gate 120 to the flip-flop 124 by depressing the return key 63*b* on the keyboard 63, the flip-flop 124 is set and a return driving signal is supplied from the control unit 61 to the motor 127 to cause the stack plate 38 to be ascended to the uppermost position for the depositor to gain easy access to the paper currencies on the stack plate 38. When the paper currencies $4_3$ on the stack plate 38 are all removed, the AND gate 125 is opened to cause the flip-flop 123 to be set. As a result, the motors 127 and 129 are driven to cause the stack plate 38 to be descended to the predetermined position. Then, the motor 127 is stopped and the stack plate 38 is stopped there ready for the next depositing cycle. The cashbox 47 can be easily attached and detached by opening a door 134 through operation of a key 132.

The deposited paper currencies 4 are all set in the paper currency supply section 3 within the front side of the housing 1 and the rejected paper currencies $4_2$ are returned into the reject pocket 30 within the front paper side of the housing 1. The deposited paper currency is automatically stacked with the cashbox 47 when the depositor depresses the approval key 63*a* on the keyboard 63. Where it is desired to return now deposited paper currencies to the depositor, the stack plate 38 is lifted from the predetermined position to the uppermost position for the depositor to gain easy access to the paper currencies on the stack plate 38. Since a predetermined spacing is left between the covering plate 50 and the fit paper currency stacking place within the storage section 34, no trouble occurs between the depositor and the automatic paper currency depositing machine. As a result, it is possible to alleviate much inconvenience on the part of the depositor and attain much improvement from the standpoint of easiness with which the machine is put under control.

While in the above-mentioned embodiment the covering plate 50 is automatically swung open by depressing the return key on the keyboard, this invention is not restricted thereto. The covering plate 50 can be swung open and closed by the depositor himself, by effecting a locking and unlocking operation using, for example, a plunger etc. as a driving source. Although the covering plate 50 is provided above the fit paper currency stacking place within the storage section 34, it may be provided, for example, at the front side of the fit paper currency stacking place within the storage section 34. The return control circuit, the paper currency judging section etc. can be modified in various ways without departing from the spirit and scope of this invention.

In the embodiment shown in FIG. 3 is provided an alarm device 140 adapted to be operated in response to an output signal from the CPU 101. The alarm device 140, when the detector 31*a*, 31*b* within the reject pocket 30 detects any unfit paper currencies or overlapped paper currencies, gives an alarm, notifying the depositor to that effect. As an alarm means for the alarm device 140, a lamp 141 at the upper front of the housing 1 may be lighted or a display can be made, indicating that any unfit paper currencies or overlapped paper currencies are detected within the reject pocket 30. An alarming sound may also be used to attract the depositor. The alarm device 140 is used in order for the depositor to be urged to re-deposit any overlapped paper currencies into the paper currency supply section 3. As such a display lamp 141, use may be made of a pair of lamps 141*a*, 141*b*, one 141*a* for indicating that the paper currency in the reject pocket 30 should be re-deposited into the paper currency supply section 3 and one 141*b* for indicating that the unfit currency should be removed away from the reject pocket 30.

That is, the display lamp is used to indicate that, if any overlapped paper currencies are detected within the reject pocket 30, they should be re-deposited into the paper currency supply section 3. This means that the overlapped paper currencies can be re-deposited, as a possible fit paper currency, into the paper currency depositing machine. When all the overlapped paper currencies are so re-deposited, any paper currency still left within the reject pocket 30 is indicated as being unfit for deposition. In this case, the depositor can deposit any rejected genuine paper currency at the window of the bank or replace it by paper currencies at hand.

Figure 7:
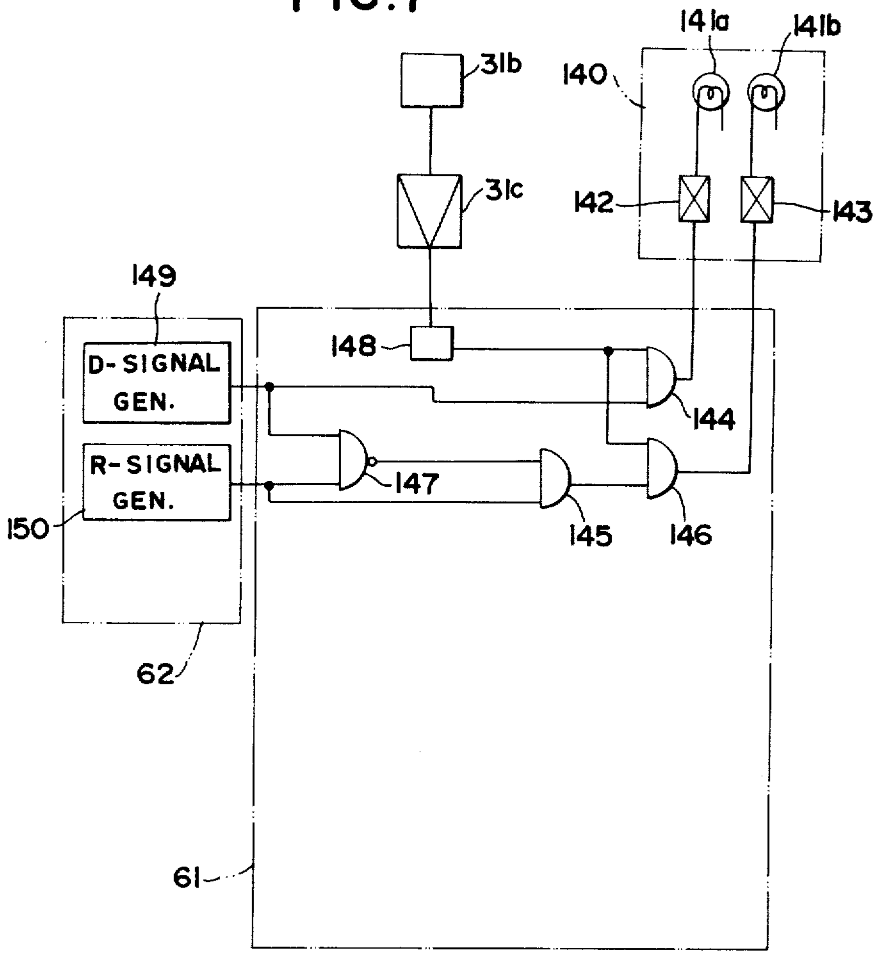
FIG. 7 is an arrangement of a circuit for effecting an alternate display.

FIG. 7 shows, by way of example, a circuit for effecting an alternate indication. In the circuit shown in FIG. 7, 141*a* is an illumination lamp within the alarm device 140; 141*b* is an "unfit" indicating illumination lamp; 142 is a drive circuit for the lamp 141*a*; and 143 is a drive circuit for the lamp 141*b*. 144, 145 and 146, each, show an AND gate within the control unit 61, while 147 and 148 are an NAND gate and inverter, respectively, within the control unit 61. 149 and 150 within the identifying-totalizing device 62 show, respectively, a section for supplying a D-signal representative of the overlapped paper currencies and a section for supplying an R-signal representative of the detection of any unfit paper currencies etc. Where the signals D and R are both present, a sensor 31*b* becomes dark and an output 0 appears from the amplifier 27 i.e. the inverter 148 generates an output 1. The output 1 of the inverter 148, together with an output signal 1 from the section 149, is coupled to the AND gate 144 to illuminate the lamp 141*a*, indicating the depositor that the corresponding paper currencies should be redeposited into the paper currency supply section 3. The lamp 141*b*, on the other hand, remains unlighted, since the output signal 0 of the AND gate 145 is supplied to the AND gate 146. Where only the signal D is present, the lamp 141*a* only is lighted, since the signal R is 0. In the absence of any overlapped paper currencies, the AND gate 144 is not opened since the signal D is 0, and the lamp 141*b* alone is lighted, indicating that any rejected bank note should no longer be re-deposited into the paper currency depositing machine. In the presence of the signal R only, the output 1 of the NAND gate 147, together with the output 1 of the section 150, is supplied to the AND gate 145 to cause the latter to be opened. As a result, the AND gate 146 is opened to cause only the lamp 141*b* to be opened.

By so doing, the re-deposition indication is preferentially made when either the overlapped paper currencies and unfit paper currencies are both present within the reject pocket 30, or the overlapped paper currencies alone are present within the reject pocket 30. Consequently, the depositor can re-deposit such paper currencies into the bank note depositing machine without any hesitation.

What we claim is:

1. An automatic paper currency depositing machine comprising:

a supply section for receiving paper currencies disposed substantially vertically;

means for determining genuineness, validity and kind of each paper currency and the presence of overlapped paper currencies and providing an output signal in response thereto, means for singularizing the paper currencies disposed in said supply section and for serially transferring the paper currencies from said singularizing means to said determining means;

a gate for sorting the paper currencies into fit, unfit and overlapped paper currencies in response to said signal provided by determining means;

means for transferring each paper currency from said determining means to said sorting gate;

a reject container;

means for transferring the unfit and overlapped paper currencies sorted by said gate into said reject container;

a storage section;

means for transferring the fit paper currencies sorted by said gate into said storage section; and means for calculating the total amount of fit paper currencies.

2. A machine according to claim 1 wherein said supply section has a receiving chamber for retaining said paper currencies in a substantially vertical orientation, a cover plate for opening and closing said receiving chamber, said paper currencies being spaced from said singularizing and transfer means when said cover plate is opened, and means coupled to said cover plate for moving said paper currencies adjacent said singularizing and transfer means when said cover plate is moved to its closed position.

3. A machine according to claim 2 including means for automatically opening said cover plate at the time of depositing said paper currencies and means responsive to closing the cover plate to automatically actuate the depositing machine.

4. A machine according to claim 1 wherein said singularizing and transfer means comprises a vacuum takeout roll for applying a suction force to the upper portion of the paper currencies vertically held in said supply section and means for blowing air toward the paper currencies to separate the same when held vertically.

5. A machine according to claim 1 wherein said storage section includes means for returning at least a portion of the deposited paper currencies, a stack plate vertically movable between first and second positions and in said first position disposed horizontally adjacent said return means, and means for controlling the movement of the stack plate to locate said stack at predetermined elevations in said storage section.

6. A machine according to claim 1 including a housing for said machine, said storage section including a cashbox provided within the front side of said housing for receiving the fit currencies; a cover plate to cover a portion of said cashbox; means for actuating said cover plate to open or close the same; means for temporarily stacking fit currencies deposited and finally stacking them within the cashbox; and a depositing mechanism including a control section for transferring a signal to the storage section to cause the deposited fit currencies to be received in the bashbox when the amount of currencies deposited coincides with the amount of currencies displayed on the depositing machine.

* * * * *